Feb. 16, 1971  L. M. BREWER  3,563,033
FLUID SYSTEM CHARGING VALVE
Filed June 19, 1969

INVENTOR.
Lee M. Brewer
BY
D. L. Ellis
ATTORNEY

United States Patent Office 3,563,033
Patented Feb. 16, 1971

3,563,033
FLUID SYSTEM CHARGING VALVE
Lee M. Brewer, Saginaw, Mich., assignor to General Motors Corporation, Detroit, Mich., a corporation of Delaware
Filed June 19, 1969, Ser. No. 834,763
Int. Cl. F15b 1/02
U.S. Cl. 60—51                    2 Claims

ABSTRACT OF THE DISCLOSURE

A recirculating fluid power steering system for automotive vehicles including a pump and a power steering gear unit is further provided with a secondary source of accumulator fluid pressure connected through the return line from the steering gear, and a charging valve operative in response to the decay of pressure fluid stored within the accumulator to a predetermined minimum to thereafter draw incoming pressure fluid from the steering gear return and pressurize the accumulator to a predetermined maximum whereafter the return line from the steering gear is again communicated to the power steering reservoir. The charging valve is provided with optimum bistable operating characteristics through use of telescopically related control valve and sensing plunger members including valving means operative over a limited travel range in the telescopic movement between the parts to cause snap-action movement of the control valve between accumulator charged and charging positions.

---

One feature of ths invention is that it provides an improved charging valve for fluid systems including accumulators or like devices which must be kept charged over a predetermined range of fluid pressure, the valve having optimum bistability in its operating positions corresponding to the system charged and the system charging conditions thereof.

Another feature of this invention is in the provision of such a charging valve constructed of telescopically related control valve and sensing plunger members having valving means thereon operative in only a limited range of relative telescopic positions between the parts and occurring in each of the system charged and system charging conditions of the valve and operative to cause snap-action response of the control valve telescopically relative to the sensing plunger removing the valving means from such operating range when either the predetermined minimum or predetermined maximum pressure of the system is reached.

Certain other features of the invention relate to economy of manufacture and compactness of parts within the charging valve.

These and other features and advantages of the invention will be readily apparent from the following specification and from the drawings wherein.

Figure 1:
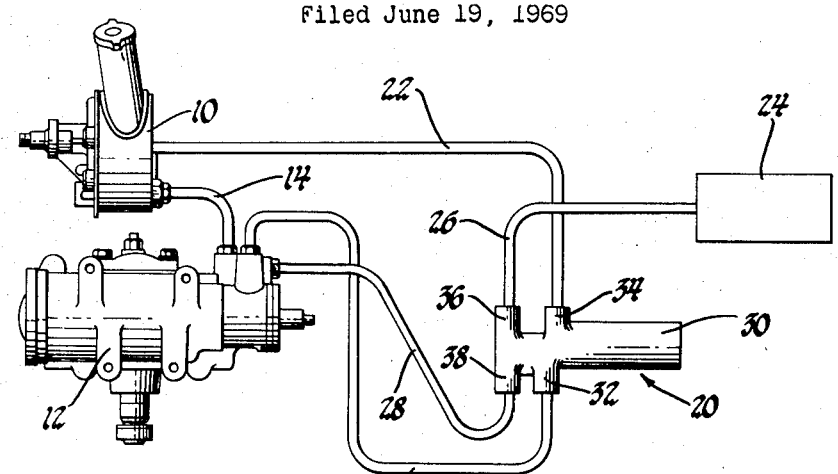
FIG. 1 is a schematic view of a power steering system for automotive vehicles including a system charging valve according to this invention.

Referring particularly to FIG. 1 of the drawings, an automotive vehicle power steering system incorporating the system charging valve of the invention is shown and includes a power steering pump unit 10 of known character and including an integral reservoir or sump for the pressure fluid within the power steering system. The pump serves as a primary source of pressure fluid for operation of the integral steering gear unit 12 of the vehicle having connection with the pump through a conduit 14. Pressure fluid recirculating from the steering gear travels a conduit 16 to the charging valve of this invention, designated generally as 20. A bypass conduit 22 from the charging valve returns to the reservoir portion of the pump unit 10. An accumulator tank 24 is provided as a secondary source of fluid pressure for operation of the steering gear 12 in the event of loss of primary pressure fluid, the tank being connected through the charging valve by a conduit 26 and a further conduit 28 to a secondary pressure inlet in the steering gear 12. For the details of operation and structural details of steering gear modifications suitable to the use of a secondary source of accumulator pressure fluid as generally shown in FIG. 1, reference may be had to the copending application of Robert P. Rohde, Ser. No. 830,241, filed June 4, 1969 and assigned to the assignee of the present invention.

Figure 2:
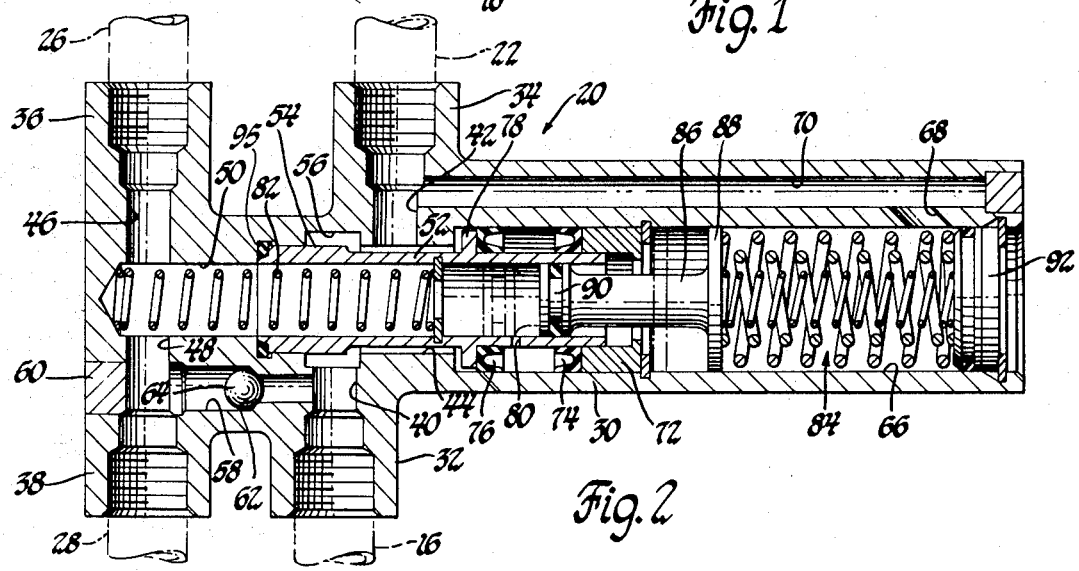
FIG. 2 is an enlarged sectional view of the charging valve shown in system-charged position.
Figure 3:
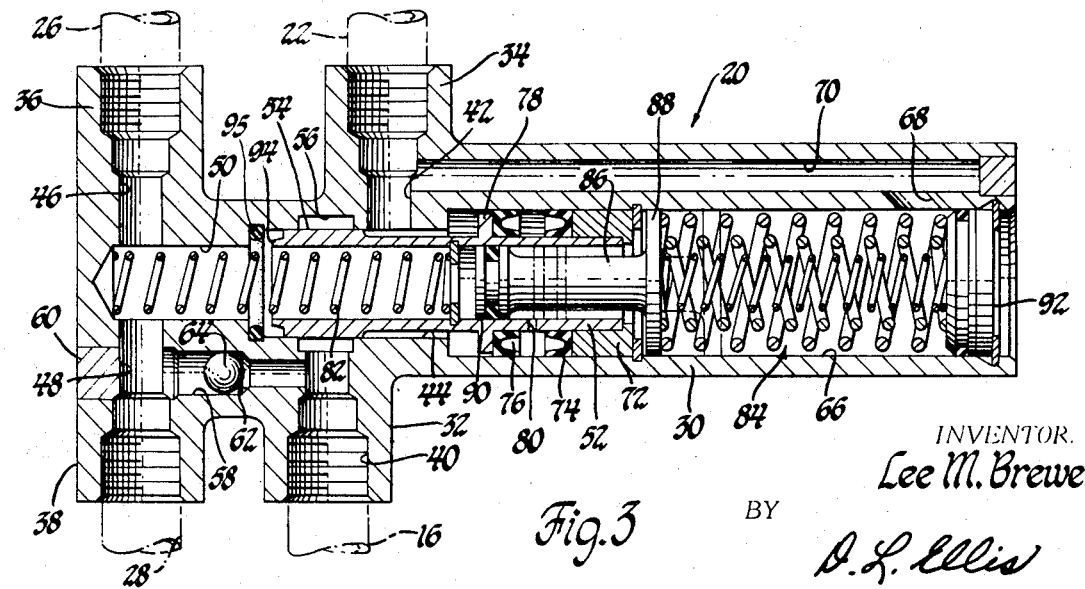
FIG. 3 is a view similar to FIG. 2 showing the charging valve in charging position.

Referring now particularly to FIGS. 2 and 3 of the drawings, the charging valve 20 includes a housing 30 provided with connecting portions 32 and 34 bored and threaded for suitable coupling with the housing of the return conduit 16 from steering gear 10 and the bypass conduit 22, respectively. Similar connector portions 36 and 38 of the housing are similarly coupled with the accumulator supply conduits 26 and 28 respectively. Passages 40 and 42 from conduits 16 and 22 respectively lead to a central bore 44 in the housing, and passages 46 and 48 from the conduits 26 and 28 communicate with an extension 50 of such bore 44. A generally cylindrical control valve spool 52 is mounted for slidable movement within the housing 30 at bore 44 thereof and includes an enlarged land 54 functional with respect to an annular groove 56 formed within the bore and communicating with the passage 40. The spool 52 is movable between an accumulator charged position shown in FIG. 2 wherein land 54 is located as shown to provide communication through conduit 16, passage 40 to passage 42 and bypass conduit 22, and a system charging position shown in FIG. 3, causing blocking of the groove 56 by the land 54 as shown to interrupt communication between conduit 16 and bypass conduit 22. A longitudinal passage 58 is provided in the housing 30 and capped at 60, the passage including a truncated conical valve seat 62 cooperable with a valve ball 64 to alternately open and close communication between the return conduit 16 from the steering gear and the accumulator passages 46 and 48.

The elongated end portion of housing 30 includes an enlarged extension 66 of the central bore 44 providing a spring-pack chamber, the bore extension 66 being communicated via a port 68 with a longitudinally extending bypass passage 70 connecting with passage 42 to conduit 22. Seated within the bore extension 66 is an annular retainer 72 held by a snap ring and seating at its other end an annular sealing member 74 located closely about the valve spool 52. A similar seal 76 opposes seal 74 and abuts against a flange 78 of the spool. The seals 74 and 76 provide an expansible and contractible reaction piston chamber adapted for communication with the interior of spool 52 by a radial passage 80. A coil compression spring 82 seats at one end on the end of bore extension 50 and at its other end on a snap ring retained in an annular groove interiorly of the spool 52. The spring 82 serves to bias the spool 52 from the charged position shown in FIG. 2 to the system charging position of FIG. 3.

Contained within the bore extension 66 is a spring-pack 84 consisting of several coil compression springs seated on a relatively loosely or nonsealingly fitting enlarged end 88 of a piston plunger 86. The shank of the plunger terminates in an enlarged piston head 90 carrying an O-ring or like seal within an annular groove thereof sealingly engaged with the interior annular surface of the spool 52. The end of extension bore 66 is suitably capped at 92.

In operation of the system, it is desired that the accumulator 24 be held in a range of fluid pressure in the volume of fluid contained therewith between a predetermined maximum and minimum values. The position of the valve parts shown in FIG. 2 for charging valve 20 shows the condition of maximum pressure within the accumulator 24 and it is seen that the spool valve 52 is located in a corresponding so-called accumulator charged position communicating passages 42 and 40. The maximum level of pressure contained within accumulator 24 is supplied through passage 46 and bore extension 50 to the reaction piston chamber surrounding the spool valve via the sensing passage 80. Such maximum accumulator pressure acts on the area of seal 76 to provide a predetermined pressure force overcoming the combined forces of both the predetermined prestress and rate of coil spring 82 and the accumulator pressure force acting on annular end 94 of the spool 52, to cause bottoming of the spool 52 leftwardly against a face seal 95 within bore 44 in the position shown in FIG. 2. Likewise, plunger 86 is shown in a position of maximum accumulator pressure wherein the piston has been forced rightwardly against the prestress and rate of spring-pack 84. As is seen, the end of piston head 90 is located substantially away from the sensing passage 80 over a range of distance or relative movement between the parts reflecting the range of fluid pressure within the accumulator 24 over which the charging valve operates.

Assuming now a decay of pressure within accumulator 24 occasioned by use thereof in operation of steering gear 12, plunger 86 is responsive to the drop in pressure within the bore extension 50 and moves leftwardly under the bias of spring-pack 84 toward the sensing passage 80. When the piston head 90 reaches the position shown in broken lines in FIG. 2 at the corresponding minimum system pressure within accumulator 24 which has been selected, it is seen that the rightward side of the piston head has moved to open the sensing passage 80 for communication between the reaction piston chamber at seals 74 and 76 and the bypass passage 70 through bore extension 66. Thus, all high pressure fluid theretofore contained within the reaction piston chamber is allowed to exhaust and spring 82 is thus enabled to overcome and move the spool 78 to the accumulator charging position.

FIG. 3 shows this position of the parts and it is seen that as above-described the land 54 blocks communication through groove 56 between the incoming pressure fluid from return conduit 16 to the bypass conduit 22, thus causing a system pressure buildup through the steering gear and pump causing shifting of the ball 64 off its seat 62 and passage of the incoming pressure fluid through the passage 58 and into the accumulator conduit 26 to cause pressure buildup therewithin. As such pressure buildup occurs, the pressure is sensed at piston head 90 causing the plunger 86 to shift from its charging position, shown in solid lines corresponding to the minimum accumulator pressure, toward the position shown in broken lines corresponding to the maximum accumulator system pressure. In so moving, the piston head 90 moves rightwardly toward the broken line position to uncover the passage 80 upon attaining the maximum system pressure in accumulator 24. The accumulator pressure is thus fed directly through bore extension 50 and passage 80 to the reaction piston chamber and area of seal 76. The high or maximum accumulator pressure felt therein thus acts directly to counteract the bias of coil spring 82, as well as the accumulator pressure felt at the lesser area on the end 94 of spool 52, and shift the spool leftwardly from the accumulator charging position back to the charged position shown in FIG. 2 opening the groove 56 for communication of incoming pressure fluid directly to the bypass conduit 22. Thus, pressure is relieved within the system to the point where the ball valve 64 will seat under the pressure of the accumulator fluid in conduit 26 and the system readied for another cycle of accumulator pressure decay and shifting of the spool 52 to an accumulator charging condition.

From FIGS. 2 and 3 it is appreciated that within the full accumulator pressure range reflected by the total stroke of plunger 86 relative to spool 52 in either position of the latter, the reaction area valving provided at sensing passage 80 by piston head 90 occurs only over a limited travel range adjacent the end positions of the plunger corresponding to the predetermined minimum and maximum accumulator pressures, and that upon occurrence of such valving in this limited range, the spool is snap-responsive quickly to a position removing the relative position of the parts from this limited valving range to render the charging valve exceedingly bistable; i.e., not subject to any tendency to seek equilibrium positions between its operative conditions.

It will also be appreciated that the accumulator pressure range is varied simply by correct selection of the strength and prestress of spring-pack 84 and the width of piston head 90.

Having thus described the invention, what is claimed is:

1. In a fluid system including a source of fluid pressure, an accumulator, and bypass sump means, a charging valve comprising, a housing, control means including a control valve member movable within said housing between an accumulator charged position wherein said control valve connects said source with said sump means bypassing said accumulator and a charging position wherein said control valve connects said source and said accumulator, first means biasing said control valve member to said charging position thereof, piston means on said control valve member effective under fluid pressure thereon supplied by said accumulator to counteract said first biasing means to locate said control valve member in said accumulator charged position thereof, a pressure sensing plunger member in said housing movable therein relative to said control valve member, second biasing means urging said sensing plunger member in one direction of movement in said housing relative to said control valve member, means communicating the pressure fluid within said accumulator to said sensing plunger member for pressure counteraction against said second biasing means urging said sensing plunger member in the opposite direction relative to said control valve member, and valve means on said member effective over a limited range of relative positions therebetween to alternately connect said piston means with said accumulator or said bypass sump means, said valve means being operative by decay of accumulator pressure and movement of said plunger member in said one direction thereof relative to said control valve member with the latter in said accumulator charged position thereof to enter said limited effective range and communicate said piston means with said bypass sump means permitting said first biasing means to quickly move said control valve member in an opposing direction of relative movement from said accumulator charged to said charging position thereof removing said control valve member from said limited effective range, said valve means being further operative by movement of said plunger member in said opposite direction thereof relative to said control valve member with the latter in said charging position thereof against the action of said second biasing means by pressure increase in said accumulator to enter said limited effective range and communicate said piston means with said accumulator permitting said piston means to overcome said first biasing means and move said control valve member quickly in an opposing direction of relative movement from said charging to said accumulator charged position thereof removing said valve means from said limited effective range thereof.

2. In a fluid system including a source of fluid pressure, an accumulator, and bypass sump means, a charging valve comprising, a housing including a plurality of passage means connected respectively with said source, said accumulator and said sump means, a control valve member slidable within a bore of said housing between an accumulator charged position wherein said control valve connects the passage means to said source with the passage means to said sump bypassing said accumulator and a charging position wherein said control valve connects the passage means to said source with the passage means to said accumulator, first spring means biasing said control valve member to said charging position thereof, a reaction chamber within said housing receiving a piston portion of said control valve member effective under fluid pressure thereon supplied by said accumulator to counteract said first spring means to locate said control valve member in said accumulator charged position thereof, a pressure sensing plunger member mounted telescopically within said control valve member, second spring means urging said sensing plunger member in one direction of telescoping movement relative to said control valve member, means communicating the pressure fluid within said accumulator through said housing bore to a piston head of said sensing plunger member for pressure counteraction against said second spring means urging said sensing plunger member in the opposite telescopic direction relative to said control valve member, and valve means on said member effective over a limited range of relative telescopic positions therebetween in the charging and accumulator charged positions of said control valve member to alternately connect said housing reaction chamber with said accumulator or said bypass sump means, said valve means including a passage in said control valve member communicated to said reaction chamber and controlled by a land on said plunger member, said valve means being operative by decay of accumulator pressure and movement of said plunger member in said one direction thereof relative to said control valve member with the latter in said accumulator charged position thereof to enter said limited effective range and communicate said reaction chamber with said bypass sump means permitting said first spring means to quickly move said control valve member in an opposing direction of relative movement from said accumulator charged to said charging position thereof removing said control valve member from said limited effective range, said valve means being further operative by movement of said plunger member in said opposite direction thereof relative to said control valve member with the latter in said charging position thereof against the action of said second spring means by pressure increase in said accumulator to enter said limited effective range and communicate said reaction chamber with said accumulator permitting said piston portion to overcome said first spring means and move said control valve member quickly in an opposing direction of relative movement from said charging to said accumulator charged position thereof removing said valve means from said limited effective range thereof.

References Cited

UNITED STATES PATENTS 3,458,998  8/1969  Bishop _____ 60—51

EDGAR W. GEOGHEGAN, Primary Examiner

U.S. Cl. X.R.

60—52; 137—112